UNITED STATES PATENT OFFICE.

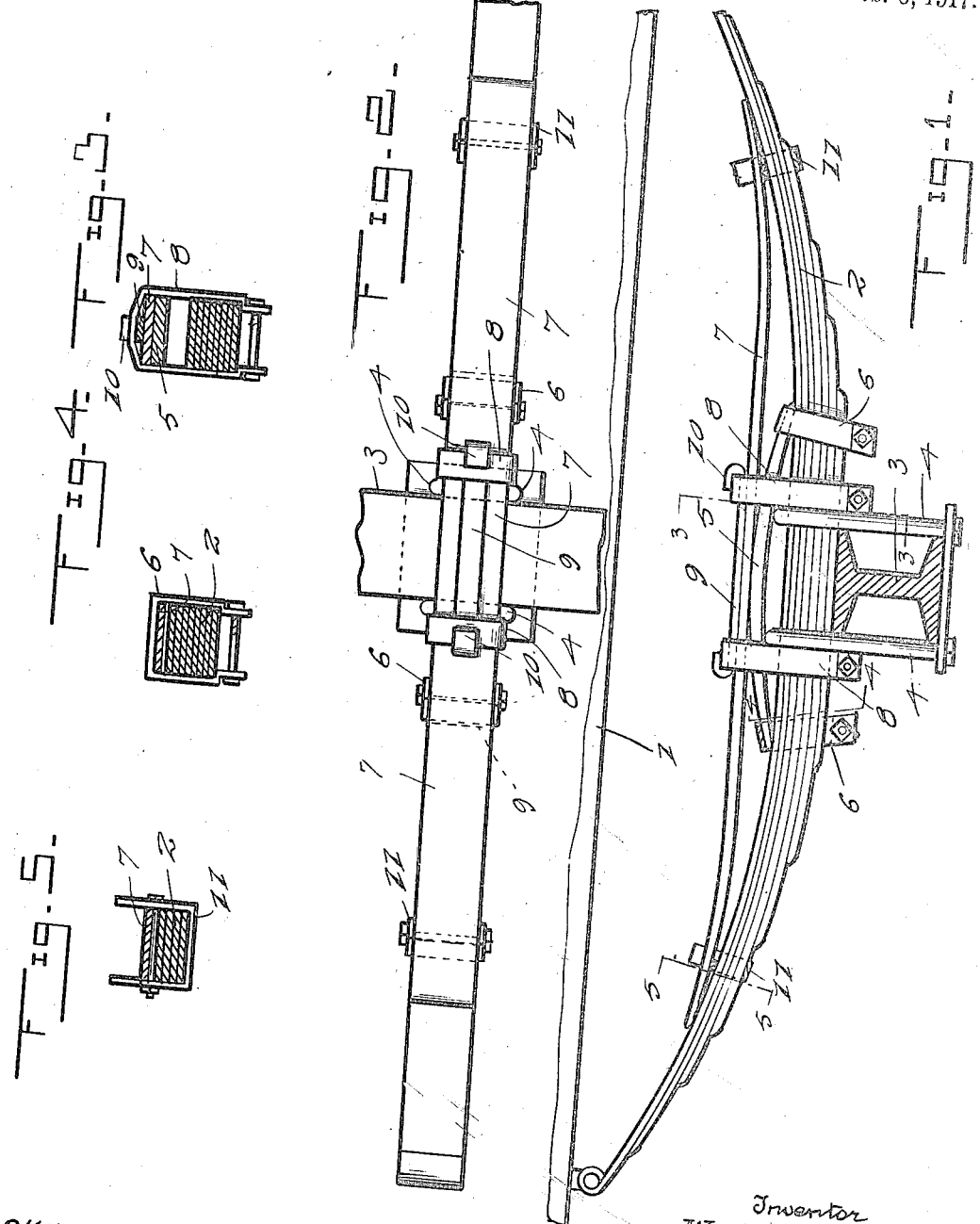

WILLIAM A. CROOK, OF BREWTON, ALABAMA.

SHOCK-ABSORBER.

1,215,122.  Specification of Letters Patent.  Patented Feb. 6, 1917.

Application filed August 19, 1916. Serial No. 115,829.

*To all whom it may concern:*

Be it known that I, WILLIAM A. CROOK, a citizen of the United States, residing at Brewton, in the county of Escambia and State of Alabama, have invented certain new and useful Improvements in Shock-Absorbers; and I do hereby declare the following to be a full, clear, and exact description of the invention, such as will enable others skilled in the art to which it appertains to make and use the same.

This invention relates to a shock absorber and to the type especially adapted for automobiles and like vehicles and has for its primary object the provision of means for absorbing the rebound of a spring caused by the automobile or like vehicle passing over uneven ground, obviating jolts and jars caused by the rebound of the spring and which provides substantially smooth and easy riding for the occupant of the automobile or the like.

Another object of this invention is to provide a spring preserver secured at a point centrally of the spring for distributing the strain upon the spring and relieving the strain upon the spring at a point of attachment to the axle of the automobile or like vehicle.

A further object of this invention is the provision of a shock absorber of the above stated character, which shall be simple, durable and efficient, and which may be manufactured and sold at a comparatively low cost.

With these and other objects in view as will become more apparent as the description proceeds, the invention consists in certain novel features, of construction, combination and arrangement of parts as will be hereinafter more fully described and claimed.

For a complete understanding of my invention, reference will be had to the following description and accompanying drawing, in which:—

Figure 1 is a side elevation of a shock absorber constructed in accordance with my invention.

Fig. 2 is a top plan view of the same.

Fig. 3 is a sectional view taken on the line 3—3 of Fig. 1.

Fig. 4 is a similar view taken on the line 4—4 of Fig. 1.

Fig. 5 is a similar view taken on the line 5—5 of Fig. 1.

Referring in detail to the drawing, the numeral 1 indicates the forward portion of the chassis of an automobile, having rigidly secured thereto a semi-elliptical spring 2 of the ordinary construction and to which my invention is applied. The usual front axle 3 is secured to the spring 2 by substantially U-shaped clips 4.

A leaf spring 5 is positioned upon the upper face of the semi-elliptical spring 2 so that the leaf spring 5 rests upon the U-shaped clips 4 and has each end secured into an engagement with the semi-elliptical spring 2 by clips 6. The leaf spring 5 being positioned upon the semi-elliptical spring 2 will form a spring preserver and also will distribute the strain upon the semi-elliptical spring 2 caused by the front axle 4 and place it upon the semi-elliptical spring 2 at each side of the attaching point of the axle to the spring 2, thus overcoming the danger of breaking or snapping the spring at a point of the attachment of the axle thereto.

A shock absorber 7 consisting of a leaf spring of greater length than the leaf spring 5 is positioned upon the leaf spring 5 and has each of its ends in engagement with the semi-elliptical spring 2 at points adjacent its hinged ends. Substantially U-shaped clips 8 secure the shock absorber 7 upon the leaf spring 5 by passing around the semi-elliptical spring 2. The clips 8 being secured together by a strip 9 having each end bent to form hooks 10 which engage the clips 8 and prevent them from sliding upon the shock absorber 7 and also upon the semi-elliptical spring 2 and which will prevent the clip 4 from lateral movement upon the semi-elliptical spring 2, obviating the danger of loose clips or a loose connection between the axle and the semi-elliptical spring 2. The free ends of the shock absorber 7 are received within clips 11 carried by the semi-elliptical spring 2 to prevent accidental displacement of the free ends of the shock absorber upon the spring 2.

From the foregoing description taken in connection with the accompanying drawing, it will be noted that the shock absorber 7 will absorb the rebound of the spring 2 caused by the automobile or like vehicle passing over uneven ground and also will be furnished with a cushion seat by the preserver 5. The leaf preserver 5 besides forming a cushioning support for the shock absorber distributes the strain upon the semi-elliptical spring 2 at points upon each side of the attaching point of the axle 3 thereto, thus obviating the danger of the semi-elliptical spring 2 from becoming broken when subject to an extensive jar or jolt.

While I have shown and described the preferred embodiment of my invention, it will be understood that minor changes in construction, combination and arrangement of parts may be made without departing from the spirit and scope of the invention as claimed.

Having thus described my invention what I claim is:—

1. In combination, a semi-elliptical spring having an axle secured thereto, a leaf spring positioned upon the semi-elliptical spring and resting upon the securing means between the semi-elliptical spring and the axle, means for securing the free ends of the leaf spring to the semi-elliptical spring to form a spring preserver, and a shock absorber positioned upon the leaf spring and bearing upon the semi-elliptical spring to absorb the rebound of the semi-elliptical spring.

2. In combination, a semi-elliptical spring mounted upon an axle and substantially U-shaped clips securing the semi-elliptical spring to the axle, a spring preserver secured to the semi-elliptical spring and resting upon the substantially U-shaped clip to distribute the strain upon the semi-elliptical spring, a leaf spring positioned upon the spring preserver and having its ends in engagement with the semi-elliptical spring, and substantially U-shaped clamps surrounding the semi-elliptical spring and leaf spring to secure the leaf spring upon the spring preserver and prevent the substantially U-shaped clamps from lateral movement upon the semi-elliptical spring.

In testimony whereof I affix my signature in presence of two witnesses.

WILLIAM A. CROOK.

Witnesses:
JOHN D. LEIGH,
ROSALIE WEAVER.